US 8,448,165 B1

(12) United States Patent
Conover

(10) Patent No.: US 8,448,165 B1
(45) Date of Patent: May 21, 2013

(54) SYSTEM AND METHOD FOR LOGGING OPERATIONS OF VIRTUAL MACHINES

(75) Inventor: Matthew Conover, East Palo Alto, CA (US)

(73) Assignee: Symantec Corporation, Mountain View, CA (US)

( * ) Notice: Subject to any disclaimer, the term of this patent is extended or adjusted under 35 U.S.C. 154(b) by 900 days.

(21) Appl. No.: 12/559,990

(22) Filed: Sep. 15, 2009

(51) Int. Cl.
*G06F 9/44* (2006.01)

(52) U.S. Cl.
USPC .......................................................... 717/174

(58) Field of Classification Search
None
See application file for complete search history.

(56) References Cited

U.S. PATENT DOCUMENTS

| 7,797,747 | B1* | 9/2010 | Ferrie .............................. 726/24 |
| 2003/0014738 | A1* | 1/2003 | Dawkins et al. .............. 717/131 |
| 2010/0325644 | A1* | 12/2010 | van der Linden et al. .... 719/327 |
| 2011/0047542 | A1* | 2/2011 | Dang et al. ......................... 718/1 |
| 2011/0179417 | A1* | 7/2011 | Inakoshi ........................... 718/1 |
| 2012/0124579 | A1* | 5/2012 | Sahita et al. ...................... 718/1 |

* cited by examiner

*Primary Examiner* — Philip Wang
(74) *Attorney, Agent, or Firm* — Campbell Stephenson LLP

(57) ABSTRACT

A system and method for logging operations of guest virtual machines are provided. An execution event is triggered, in response to a request to load a software module in a virtual machine. A processor sends an indication to a hypervisor that the software module is loaded in the virtual machine, in response to the triggering of the execution event. A security appliance accesses, using the hypervisor, a first memory location in the virtual machine, in response to the indication. A value is stored in the first memory location. The value identifies the software module. The security appliance returns the value to the hypervisor.

20 Claims, 7 Drawing Sheets

SYSTEM AND METHOD FOR LOGGING OPERATIONS OF VIRTUAL MACHINES

FIELD OF THE INVENTION

This invention relates to data processing systems, and in particular, managing virtual data processing systems.

DESCRIPTION OF THE RELATED ART

As modern computers become more powerful, the use of hardware and software virtualization to implement virtual machines is becoming more common. Virtual machines are software implementations of a physical computer that execute computer instructions in the manner of physical computer hardware. Whether a single computer or a group of networked computers, many (if not most) of today's computer systems are able to act as a host computer system to multiple virtual machines.

A computer system supporting multiple virtual machines typically does so, at least in part, though the use of system software and/or hardware that manages the host computer system's resources in a manner that allows the host computer system to present a hosted virtual environment to each of the virtual machines. In so doing, each virtual machine is able to operate as if the host computer system were solely under its control, and so share the host computer system's resources. For example, the host computer system will typically include at least one processor and system memory. The aforementioned system software and/or hardware support the sharing of these resources by providing processor resources and memory management to each of the virtual machines. Such virtualization functionality can be provided, for example, through the use of a system virtual machine (sometimes referred to as a hardware virtual machine), which allows the sharing of the underlying physical machine resources between different virtual machines, each running its own operating system (OS; which can vary from virtual-machine-to-virtual-machine, or can be the same OS across all virtual machines).

However, in order for the virtual machines to successfully co-exist with one another, the system software and/or hardware also needs to be able to coordinate and manage these demands for host computer system resources, typically. These needs are addressed by a virtualization component (e.g., a software abstraction layer) that is commonly referred to as a "hypervisor." A hypervisor can be executed on "bare hardware" (i.e., execute on physical hardware, without need for intervening software; and which is also referred to as a native virtual machine), or alternatively, can interface with the physical hardware via an operating system (also referred to as a hosted virtual machine). As will be appreciated, however, one or more of a hypervisor's functions can be implemented directly in hardware, rather than being implemented in software. Using the foregoing example, a hypervisor supports multiple virtual machines by coordinating processor resources to support the execution of instructions on behalf of the various virtual machines, and performing memory management to help ensure that the virtual machines effectively share the host computer's system memory, for example.

A computer system supporting multiple virtual machines in such a manner can offer security benefits, such as the isolation of one virtual machine from another. For example, if one virtual machine becomes corrupted due to, for example, malicious software that alters the behavior of the virtual machine without the user's knowledge, the malicious software corruption is less likely to spread to the other virtual machines supported by the computer system. However, such isolation often comes at a price. For example, operations internal to the virtual machine cannot be reliably determined by software and/or hardware systems that are external to the virtual machine.

What is therefore desirable is an architecture that enables support for multiple virtual machines, while enabling external systems to collect accurate information regarding the internal operations of multiple virtual machines.

SUMMARY OF THE INVENTION

According to one embodiment of the present invention, an execution event is triggered, in response to a request to load a software module in a virtual machine. A processor sends an indication to a hypervisor that the software module is loaded in the virtual machine, in response to the triggering of the execution event. A security appliance accesses, using the hypervisor, a first memory location in the virtual machine, in response to the indication. A value is stored in the first memory location. The value identifies the software module. The security appliance returns the value to the hypervisor.

Further, according to some embodiments of the present invention, a reference is redirected from a first address to a second address. The reference initially points to the first address. The first address is an address of a debug service function to be executed by the virtual machine. The second address is an address of a second memory location in a memory page within the virtual machine. The execution event, when triggered, is configured to send the indication. The indication is a message and the message indicates that the software module is loaded in the virtual machine. The execution event is installed at the second memory location.

Further, according to some embodiments of the present invention, the original association is saved between the reference and the first address.

Further, according to some embodiments of the present invention, the request to load the software module in the virtual machine results in the second memory location being accessed.

Further, according to some embodiments of the present invention, the original association is retrieved, in response to triggering the execution event. The debug service function is executed at the first address.

Further, according to some embodiments of the present invention, the memory page is a non-pageable memory page. The memory page is located in a kernel memory of the virtual machine.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

Introduction

Figure 1:
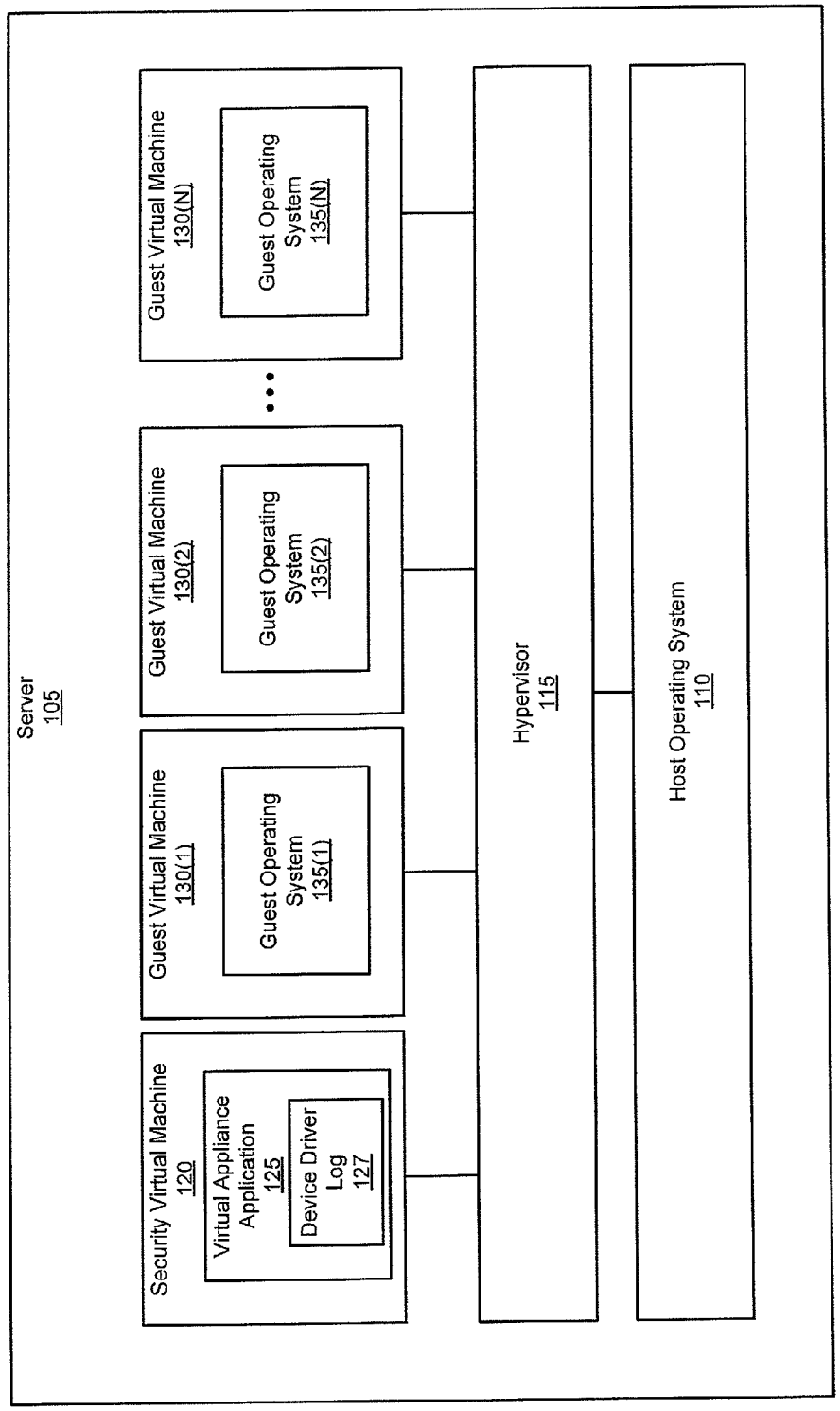
FIG. 1 is a block diagram illustrating a server that can be implemented as a host computer system, according to one embodiment.

An advantageous feature of a host computer system that supports at least one virtual machine is the ability to support the execution of more than one operating system (OS) at a time. For example, a host computer system can execute a host OS such as, for example Mac OS X®. A hypervisor such as, for example, Parallels Desktop® 4.0, can be used to provide the ability for the host computer to implement multiple virtual machines. In such an architecture, each of the virtual machines (also referred to herein as a "guest virtual machine") executes a corresponding OS (referred to herein as a "guest operating system"). Some operating systems that can be implemented within the guest virtual machines as guest operating systems include, but are not limited to, Windows XP®, Windows Vista®, Linux, Mac OS X®, and the like. A given guest operating system is thus executed within a corresponding one of the guest virtual machines.

As a result of this architecture, the guest virtual machines are logically isolated from one another, as noted. This logical isolation provides many benefits, including, but not limited to, security benefits. For example, if a guest virtual machine becomes corrupted by malicious software, a system administrator can remove the corrupted guest virtual machine and install a new replacement guest virtual machine without affecting the operation of other guest virtual machines executing on the host computer.

Despite these benefits, the logical isolation afforded by this architecture also presents various difficulties to software and/or hardware implemented outside of the guest virtual machines. For example, some host computer systems implement a security virtual machine to perform various functions such as, but not limited to, installing software updates to the guest OS, scanning for viruses and other malicious software, maintaining security software (e.g., software firewall, etc.), and logging software loaded by the guest OS for debugging purposes. The security virtual machine can be implemented on the host computer, in addition to the guest virtual machines. However, in order to perform these tasks, the security virtual machine needs to easily and accurately monitor the internal operations of the guest virtual machines, which is made difficult by the aforementioned logical isolation.

One type of operation that is internal to a guest virtual machine involves loading a software module such as a driver. A "driver" is software that controls the interactions of a device and other software that uses the device. One example of a driver is a printer driver, which enables print commands issued by software (e.g., an application software such as a word processor, etc.) to be translated into specialized commands that are compatible with a given printer. During normal operation of an OS, drivers are loaded to provide various programs with access to certain devices (e.g., a printer, scanner, digital camera, etc.). Sometimes, various drivers can conflict with one another, thus disrupting the operation of the OS. In order to correct such a driver conflict, the security virtual machine can be instructed by a user (e.g., system administrator, test engineer, etc.) to generate a history log of the drivers loaded by the OS during various points of the execution of the OS. For this history log to be of use, the log needs to be accurate.

One option in compiling a history log of the software loaded by an OS executed by a guest virtual machine involves loading a profiling module (e.g., a software or process profiler, or the like) into the guest virtual machine when the guest virtual machine is started (booted). During the execution of the OS within the guest virtual machine, the software module polls the OS for a list of the software that has been loaded. This approach can present a number of difficulties. For example, if malicious software has corrupted the guest virtual machine, the malicious software can generate inaccurate reports, and provide them to the profiling module. For example, it is not in the interest of malicious software such as a computer virus or a keystroke logger to report its presence to the profiling module. Such a report would alert the user to the presence of the malicious software. Instead, such malicious software prefers to operate without the user's knowledge, in order to prevent the user from attempting to remove the malicious software. For example, a keystroke logger generates a log of each keystroke entered by the user. The user can enter potentially sensitive information such as, for example, usernames, passwords, bank account information, social security numbers, or the like during the operation of the guest virtual machine. The effectiveness of the keystroke logger depends on the user's lack of knowledge about the very presence of the keystroke logger, in order to log as much information entered by the user as possible.

To address these and other disadvantages of this and other such techniques, embodiments of the present invention monitor code execution within guest virtual machines using, for example, a function hooking technique. Generally, an entity external (e.g., a hypervisor, security virtual machine, or the like) to the guest virtual machines modifies the guest virtual machines in response to a notification concerning an operation performed internally by the guest virtual machines. According to one embodiment of the present invention, the notification can be implemented with a message sent from the guest virtual machine in response to such an internally-performed operation.

In one embodiment, then, a virtual machine manager monitors the internal operations of the virtual machines by redirecting a reference to a first address to a second address. The first address is an address of a function to be executed by the virtual machine, while the second address is the address of a memory location on a memory page. The virtual machine manager installs an execution event at the memory location in the memory page. In response to a request that results in the memory location being accessed, an execution event is triggered. In response to the triggering of the execution event, a message is sent to the hypervisor. According to one embodiment of the present invention, the message is sent to the hypervisor directly by a processor (whether real or virtual) that is attempting to execute code on the memory page with the installed execution event. The message indicates to the hypervisor that the memory location has been accessed. The hypervisor, having been appraised of the situation, is then able to proceed with performing one or more operations that have been associated with the function.

According to another embodiment of the present invention, the hypervisor monitors the loading of device drivers by hooking a debug service routine handler function of a guest virtual machine. In other words, the debug service routine interrupt that normally triggers the debug service routine is temporarily redirected to a hook page. An execution event is installed on the hook page. When triggered, the execution event sends a message to the hypervisor, which notifies the hypervisor that the debug service routine interrupt has been accessed. In response to receiving this message, the hypervisor notifies a security virtual machine. The security virtual machine, via the hypervisor, inspects a set of input registers of the guest virtual machine to determine the identity of the device driver that is loaded. The identity of the device driver, which can be expressed as a filename or any other type of unique identifier is returned by the hypervisor to a requesting entity (e.g., a security virtual machine).

An Example Architecture for Logging Operations of Virtual Machines

FIG. 1 is a simplified block diagram that illustrates a server that can be used to communicate with clients. For example, as described subsequently in conjunction with FIG. 5, a server can communicate with clients via a direct connection or a connection via a network, such as the Internet. Those with skill in the art will appreciate that a server is only an example of any number of computer systems that can be used. As illustrated, server 105 includes a host operating system 110, a hypervisor 115, a security virtual machine 120, which further includes a virtual appliance application 125, and guest virtual machines 130(1)-(N), which further include guest operating systems 135(1)-(N).

Host operating system 110 is the OS that underlies hypervisor 115, security virtual machine 120, and guest virtual machines 130(1)-(N). Hypervisor 115 is software and/or hardware that provides server 105 the ability to concurrently execute multiple guest operating systems (e.g., guest operating systems 135(1)-(N)) via guest virtual machines 130(1)-(N). Also, as illustrated, server 105 includes a security virtual machine 120, which executes virtual appliance application 125. Virtual appliance application 125 executes on security virtual machine 120, and keeps a log of software modules loaded on a particular guest virtual machine 130(1)-(N). According to one embodiment of the present invention, the log keeps track of software modules loaded initially (e.g., at boot time of the guest virtual machine) and/or currently loaded on the guest virtual machine. According to an embodiment of the invention, the software logged by virtual appliance application 125 can include device drivers, for example. According to another embodiment of the invention, virtual appliance application 125 can also perform functions such as, for example, firewall maintenance, anti-virus scanning, volume management, I/O change tracking, memory decompression and decryption, and/or the like. As is also illustrated, virtual appliance application 125 further includes a device driver log 127. Device driver log 127 enables virtual appliance application 125 to log the software (e.g., device drivers, etc.) loaded by guest virtual machines 130(1)-(N) during the execution of guest operation systems 135(1)-(N).

By implementing virtual appliance application 125, security virtual machine 120 is able to keep an accurate log of software loaded by guest virtual machines 130(1)-(N) (e.g., device driver log 127). Such a log is kept free of influence by malicious software that can corrupt guest virtual machines 130(1)-(N), by its being maintained separately by guest virtual machines 130(1)-(N). As described subsequently in further detail in conjunction with FIGS. 2A, 2B, 3, and 4, virtual appliance application 125 monitors the execution of guest operating systems 135(1)-(N) through hypervisor 115. During execution, guest operating systems 135(1)-(N) can load device drivers to facilitate interaction between guest operating systems 135(1)-(N) and hardware devices (e.g., printers, cameras, input devices, etc.), for example.

According to an embodiment of the present invention, guest operating systems 135(1)-(N) execute a device driver loading function to load a requested device driver. During execution, the device driver loading function generates a debug service routine interrupt. In response to receiving the debug service routine interrupt, virtual appliance application 125 takes temporary control of the particular guest virtual machine (e.g., guest virtual machine 130(1)) that is executing that particular guest operating system. Virtual appliance application 125 inspects a set of input registers in the guest virtual machine to determine the identity of the loaded device driver. Then, after the identity of the loaded device driver is logged, virtual appliance application 125 returns control to the guest virtual machine. Function hooking and subsequent inspection of input registers of the guest virtual machine enables virtual appliance application 125 to determine the software that is loaded by a guest virtual machine without direct access to the OS or any source code executing on the guest virtual machine.

Figure 2A:
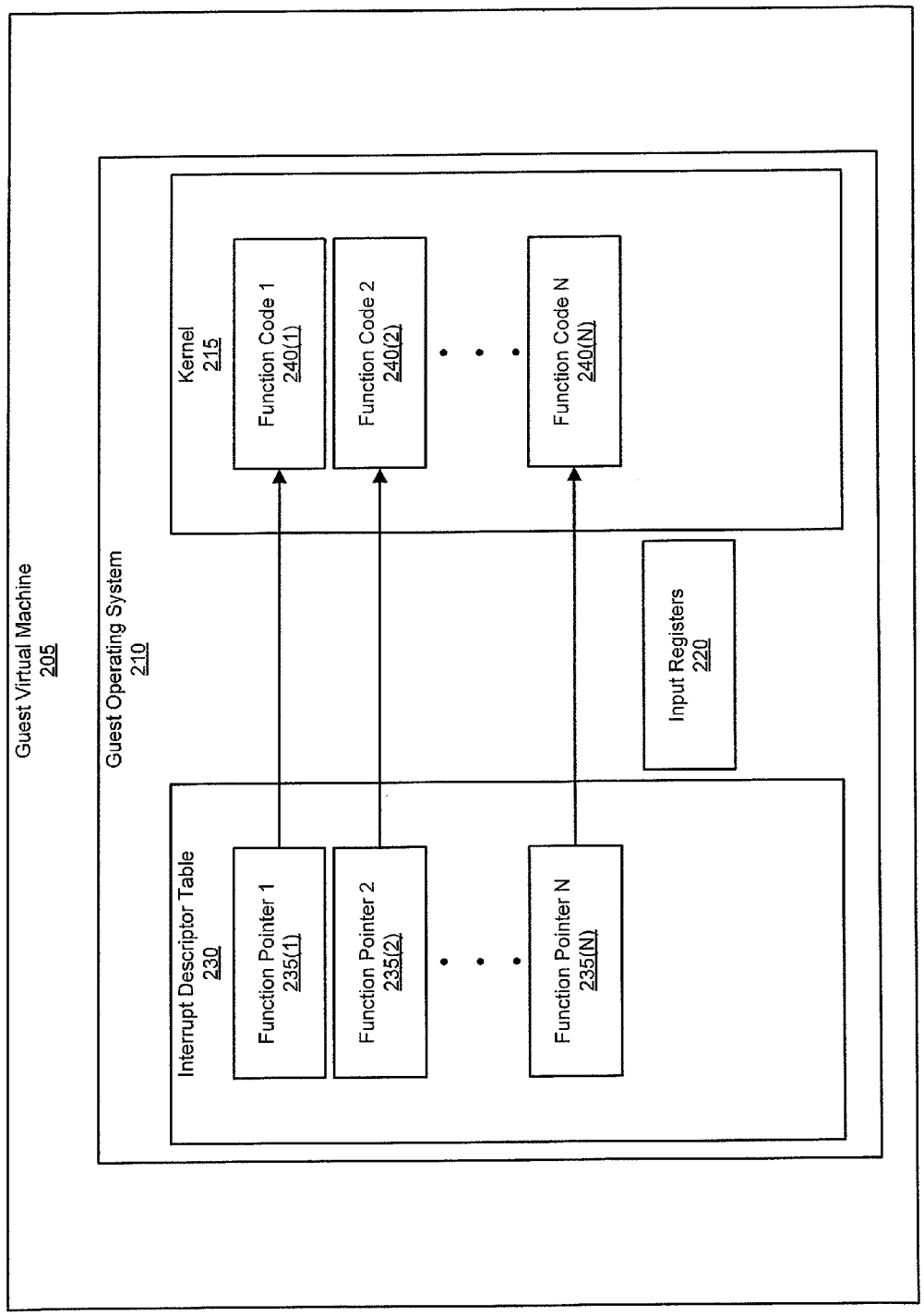
FIG. 2A is a block diagram illustrating a guest virtual machine, according to one embodiment.

FIG. 2A is a diagram of a guest virtual machine with function pointers mapped to function code in a guest operating system kernel. As previously discussed, one example of function code is a debug service function routine that indicates that software is being loaded by the guest virtual machine. As illustrated, guest virtual machine 205 (which can be used to implement guest virtual machines 130(1)-(N) of FIG. 1) includes a guest operating system 210 (which can be used to implement guest operating systems 135(1)-(N) of FIG. 1). Guest operating system 210 further includes a kernel 215 and an interrupt descriptor table 230.

Kernel 215 is a basic component of guest operating system 210 and is responsible for managing system resources of guest virtual machine 205. For example, kernel 215 manages the communication between hardware and software components within guest virtual machine 205. Guest virtual machine 205 also includes a set of input registers 220. According to an embodiment of the present invention, input registers 220, in an x86 architecture, for example, can be implemented with a collection of registers EAX, ECX, EBX, and EDI. The EAX register stores data that identifies a type of debug event (e.g., breakpoint, print message, driver loading, and the like) that is generated during the execution of guest operating system 210. ECX, EDX, EBX, and EDI registers store data that identifies a set of input parameters. For a driver loading event, as discussed herein in more detail in conjunction with FIG. 4, data stored in the ECX register represents a first input parameter. The first input parameter (which also can be implemented as a pointer) points to a string which identifies the file name of a driver being loaded by a driver loading function. Data stored in the EDX register represents a second input parameter. The second input parameter (which can be implemented as a pointer) points to a data structure that specifies location of the driver in memory (e.g., the base address and size of the driver in memory).

A computer system, whether real or virtual, performs many different tasks through various hardware and software components. For example, a computer system can accomplish these tasks by performing function calls to effect the desired operation(s). Examples of functions that a computer system might employ include functions that cause a video adapter to display image data on the computer system's video display, those that cause an input/output (I/O) adapter to accept input presented by an input device, those that cause a storage adapter to enable read and write access to a storage device (e.g., hard disk drive, flash drive, or the like), and those that cause an anti-virus utility to scan various storage devices of the computer system for malicious software, among a wide variety of such functions and others. One approach to handling these different tasks is to send a request to the given hardware or software component (e.g., make a function call), requesting that the given hardware or software component perform one or more operations, and then wait for the operation(s) to complete. A more efficient technique involves sending such a request (again, making a function call, for example), and then performing other operations, which awaiting receipt of a notification indicating that the request operation has completed. Such a notification can be implemented as an interrupt, for example. An interrupt is an asynchronous signal or message indicating need for attention or a synchronous event indicating need for a change in program execution.

As illustrated in FIG. 2A, guest virtual machine 205 supports the receipt and processing of interrupts using interrupt descriptor table 230. According to one embodiment, interrupt descriptor table 230 is a data structure used by a microprocessor architecture such as, for example, an x86 architecture, to implement an interrupt vector table. Interrupt descriptor table 230 is used by guest virtual machine 205 to determine appropriate responses to received interrupts. An interrupt vector can be implemented as an address of an interrupt handler.

According to one embodiment of the present invention, a guest virtual machine's OS employs one or more device driver loading functions to load device drivers. For example, Microsoft Windows XP® uses device driver loading functions such as ZwLoadDriver, MmLoadSystemImage, and the like, to load device drivers as needed. These device driver loading functions generate an interrupt called a "debug service routine interrupt" when executed to load device drivers. In normal operation, the debug service routine handler notifies any debugger attached to the guest virtual machine that a device driver is being loaded by the guest virtual machine.

According to embodiments of the present invention, the debugger can be implemented as a second computer system coupled to the host computer system. The host computer system and the second computer system can be coupled using a wired connection (e.g., a serial cable, IEEE 1394 Firewire connection, or the like) or a wireless connection (e.g., IEEE 802.11x, Bluetooth, or the like) and using the second computer to debug the host computer. One example of such an architecture includes implementing a second computer executing WinDbg (a software debugger provided by Microsoft®) to debug the kernel of the host computer.

Embodiments of the present invention also enable a security virtual machine to be notified by the triggering of the debug service routine handler. In response, the security virtual machine, via the hypervisor, inspects the input registers (e.g., input registers 220) of the guest virtual machine to determine the identity of the device driver being loaded by the device driver loading functions. The security virtual machine keeps a log (e.g., device driver log 127 of FIG. 1) of the device drivers loaded by the guest virtual machine.

Embodiments of the present invention can utilize pointers to reference interrupt vectors, for example. A pointer is a programmatic construct, the value of which refers to ("points to") another location in a computer-readable storage medium, typically a computer system's memory. Thus, when an interrupt is received, guest virtual machine 205 saves a current execution state (i.e., saves the location in code where the guest virtual machine was executing upon receipt of the interrupt, the value of any variables and other pertinent information). Guest virtual machine 205 then matches the received interrupt with a corresponding interrupt vector in interrupt descriptor table 230 (as referenced by function pointers depicted in FIG. 2A as function pointers 235(1)-(N); labeled in FIG. 2A as Function Pointers 1-N). Guest virtual machine 205 then begins execution of the interrupt handler referenced by the given function pointer (depicted in FIG. 2A as function codes 240(1)-(N) in kernel 215; labeled in FIG. 2A as Function Code 1-N). For example, if the function associated with Function Pointer 1 (e.g., a function named Function 1) was the function to be executed, Function Code 1 would be executed. The interrupt vector for Function Code 1 is the address of Function Code 1, which is the address pointed to by Function Pointer 1. A function pointer is a pointer that references an address, such as the address of a memory location at which the storage of the program code begins, for example. When a processor is to execute a function, the processor will typically begin execution of the function at this point in memory. Thus, according to one embodiment of the present invention, a function pointer (e.g., Function Pointer 1) can be implemented as a pointer from the debug service routine interrupt entry in interrupt descriptor table 230 to debug service routine handler function (e.g., Function Code 1).

Figure 2B:
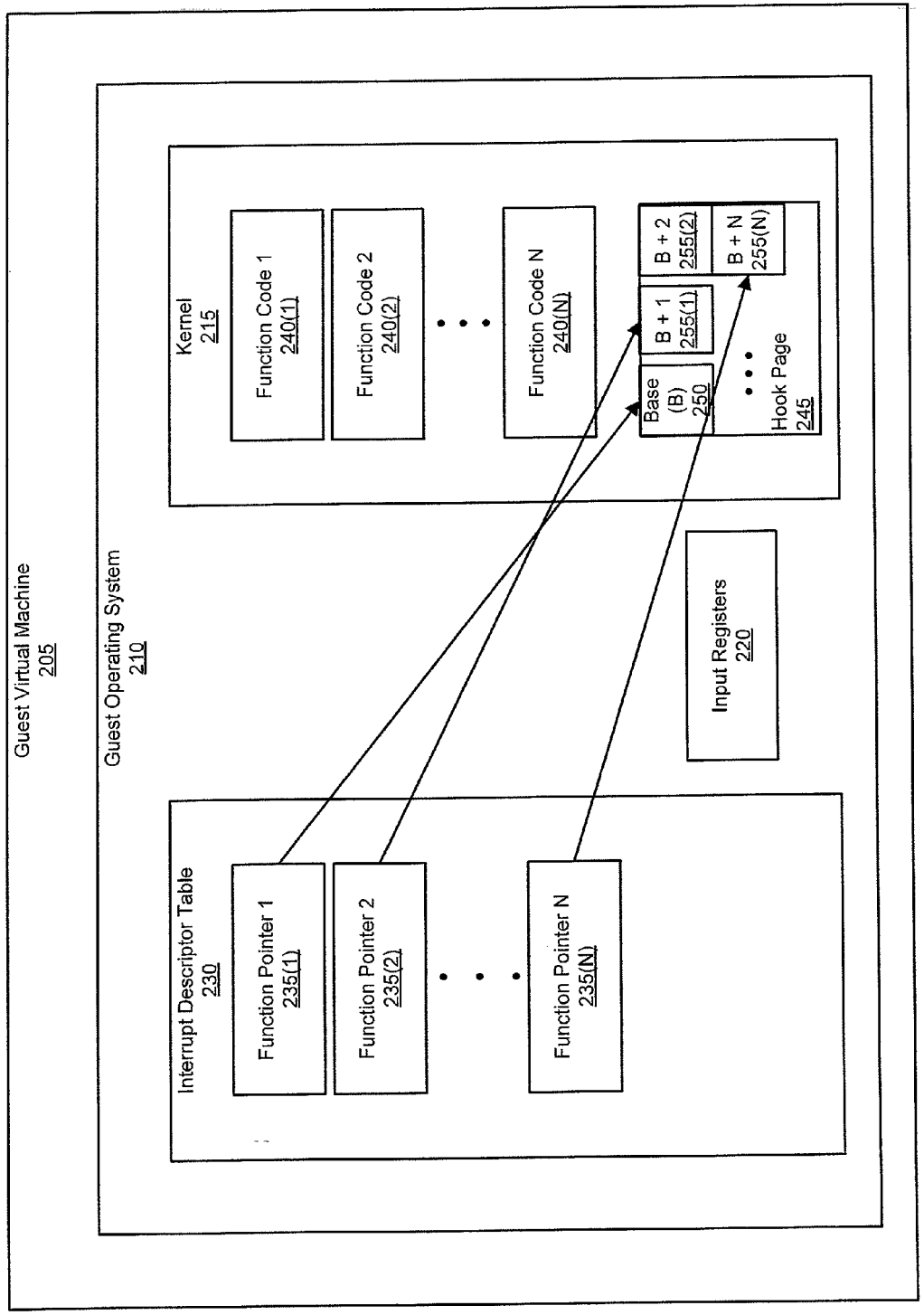
FIG. 2B is a block diagram illustrating a guest virtual machine with redirected function pointers, according to one embodiment.

FIG. 2B is a diagram illustrating a guest virtual machine with redirected pointers that can be implemented within a host computer system. According to FIG. 2B, guest virtual machine includes a hook page 245 located within kernel 215. According to an embodiment, hook page 245 is a non-pageable memory page located in the memory of guest virtual machine 205. Hook page 245 contains no function code and is mapped in memory. A memory page is a fixed-length, logically contiguous block of memory. A non-pageable memory page is a memory page that remains in physical memory and is not transferred to an auxiliary memory store such as, for example, a hard disk drive or other type of memory device, in order to free space in the physical memory.

According to one embodiment, the size of hook page 245 is 4,096 bytes, which is the page size commonly implemented by the x86 architecture. As will be appreciated, any page size can be employed, and so hook page 245 is therefore not limited to a size of 4,096 bytes. Hook page 245 is located starting at a base memory location 250. In this example, hook page 245 is referenced by a base physical address within kernel 215 (e.g., 0x10000). Hook page 245 includes a number of memory locations that are referenced with respect to the base physical address of base memory location 250 using memory location offsets (e.g., memory location B+1; memory location B+2; and memory location B+N). For example, memory location B+1 is referred to using the base physical address of base memory location 250 (B), plus an offset of 1.

According to one embodiment, hook page 245 includes an execution event (not pictured) installed at base memory location 250. When triggered, the execution event causes a message to be sent to a hypervisor (e.g., hypervisor 115 of FIG. 1) to indicate the function called by guest virtual machine 205. The installation and operation of the execution event is discussed subsequently in connection with FIGS. 3 and 4.

Also illustrated in FIG. 2B is the redirection of function pointers 235(1), 235(2), and 235(N). In FIG. 2B, function pointers 235(1), 235(2) and 235(N) are redirected from the original memory locations illustrated in FIG. 2A, to the memory locations in hook page 245. Function pointer 235(1) is therefore redirected to the address of base memory location 250 (at (B)); function pointer 235(2) is redirected to memory location 250(1) (at (B+1)); and function pointer 235(N) is redirected to memory location 250(N) (at (B+N)).

Figure 3:
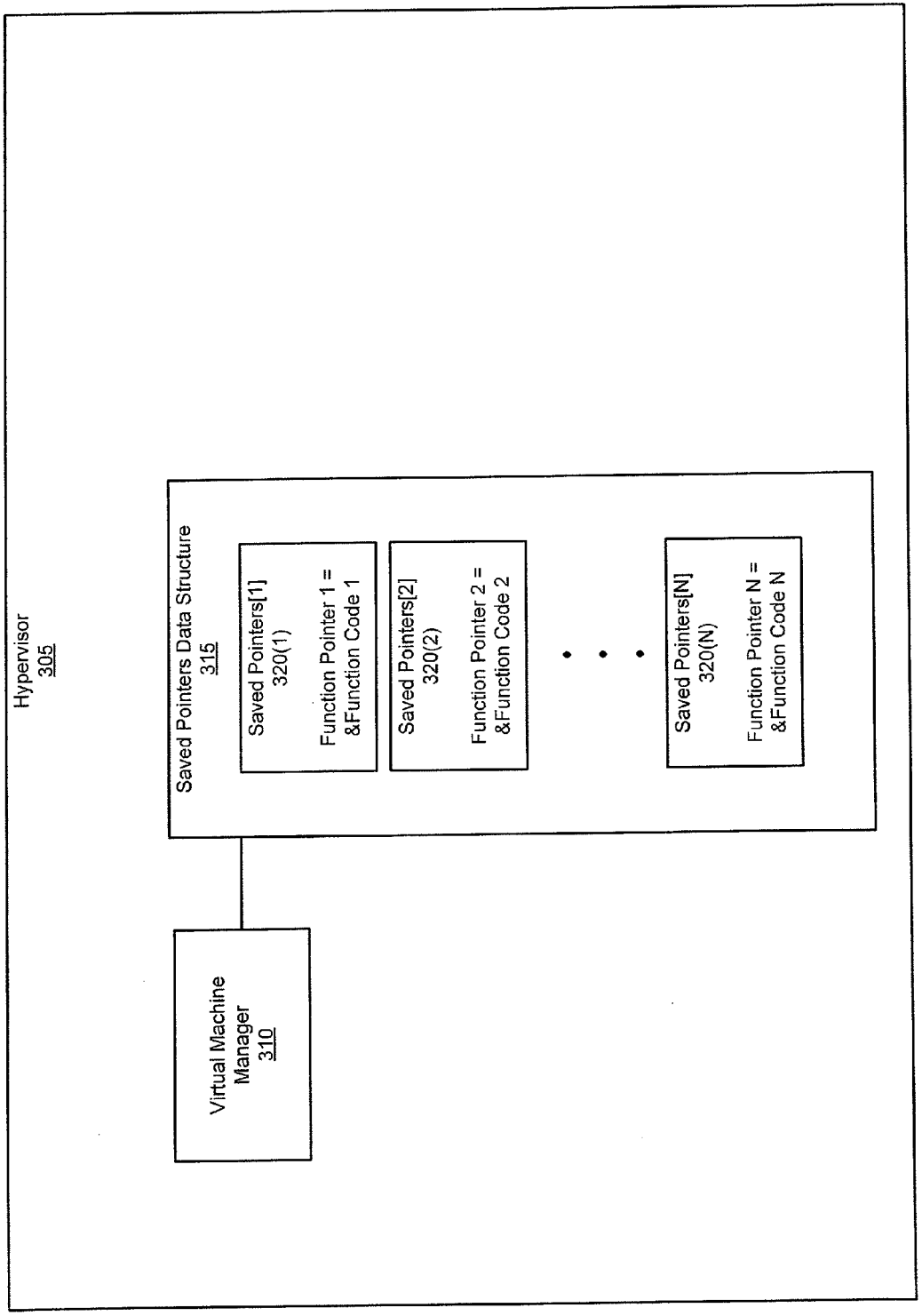
FIG. 3 is a block diagram illustrating a hypervisor for managing operations of guest virtual machines, according to one embodiment.

FIG. 3 is a diagram illustrating a hypervisor for managing the operation of virtual machines in a host computer system, according to one embodiment. Hypervisor 305 represents an implementation of hypervisor 105 of FIG. 1. As illustrated, hypervisor 305 includes virtual machine manager 310 and a saved pointers data structure 315.

Virtual machine manager 310 coordinates the operation of guest virtual machines in a host computer such as server 105 of FIG. 1. One technique used to monitor and modify the operation of the guest virtual machines involves hooking certain functions within those virtual machines. Through the use of function hooking, virtual machine manager 310 can perform the monitoring and modification operations without the need for altering or otherwise modifying the function code in the guest virtual machine. Modification of function code can be complex to implement and exposes the function code to exploitation by malicious software, among other risks and disadvantages.

Without function hooking, a virtual machine such as guest virtual machine 205 typically executes a function by simply using a function pointer that references a memory location at which the code for the function to be executed is stored. For example, referring to FIG. 2A and the example discussed earlier, guest virtual machine 205 executes Function 1 by accessing Function Pointer 1 at function pointer 235(1), which, in turn, references Function Code 1 at function code 240(1). However, without more, virtual machine manager 310 would be unable to determine that guest virtual machine 205 has requested execution of Function 1. Such is the case even if the need for such information is known a priori, because an architecture such as that shown in FIG. 2A possesses no mechanism for notifying a virtual machine manager of Function 1's execution, as a result of the logical separation between its hypervisor and virtual machines. Thus, in order for a virtual machine manager such as virtual machine manager 310 to be apprised of a request by guest virtual machine 205 to execute Function 1 (or for virtual machine manager 310 to be able to make such a determination), a mechanism is needed to allow virtual machine manager 310 to learn of a request for the execution of Function 1 by guest virtual machine 205. Such a mechanism can be provided, for example, by implementing a function hooking technique.

Referring once again to FIG. 2B, virtual machine manager 310 hooks a function call to Function 1 by allocating a hook page such as hook page 245 within kernel 215 of guest virtual machine 205. Virtual machine manager 310 then preserves the address of the original memory location, as referenced by its function pointer. That is, virtual machine manager 310 stores an association between the reference (function pointer) and the address of the memory location at which the function code begins. Thus, in the case of function pointer 235(1), this address is the address of the memory location of Function Code 1 (function code 240(1)) in kernel 215.

As shown in FIG. 3, the reference to original memory location is saved in a saved pointers data structure 315. Saved pointers data structure 315 can be implemented using one of any number of programmatic constructs that provide a number of locations for the storage of such pointers (depicted in FIG. 3 as saved pointers 320(1)-(N), and labeled as Saved Pointers [1]-[N]). More specifically, virtual memory manager 310 stores the reference to the original memory location (its address) in saved pointers 320(1). This reference is represented in FIG. 3 by "Function Pointer 1=&Function Code 1", where "& Function Code 1" is the address of the memory location at which Function Code 1 is stored within kernel 215 (a result of the "&" operation). Saved pointers data structure 315 can be implemented using a data structure such as an array, a record, an array of records, a table, and the like.

After saving the address of the original memory location in saved pointers data structure 315, virtual machine manager 310 redirects function pointer 235(1) to a memory location on hook page 245 (e.g., base memory location 250) by storing that memory location's address (B) therein. As shown in FIG. 2B, Function Pointer 1 (function pointer 235(1)) is redirected to base memory location 250. Thus, when function pointer 235(1) is accessed as part of Function 1 being called, guest virtual machine 205 attempts to execute code stored at B (base memory location 250) instead of Function Code 1.

In one embodiment, virtual machine manager 310 installs an execution event at B (base memory location 250). The execution event can be implemented as an "execution event callback," such that, when the function is called and the execution event triggered, virtual machine manager 310 receives a message from an event handler within hypervisor 305 (not shown) that specifies the particular function called (e.g., Function 1) and the virtual machine that called the function (e.g., guest virtual machine 205). Virtual machine manager 310 then performs one or more operations on behalf of guest virtual machine 205 in response to receiving the message that Function 1 was called. Typically, Function 1 will also be executed, though that need not necessarily be the case (e.g., hypervisor 305 can be designed, using multiple levels of indirection or the like, such that the thread of execution proceeds to another function or terminates, for example). For example, if Function 1 is executed in response to a possible malicious software infection, virtual machine manager 310 can send a message to a security virtual machine (e.g., security virtual machine 120 of FIG. 1) to begin scanning guest virtual machine 205 using an anti-virus component within virtual appliance application 125. In such a scenario, virtual machine manager 310 can also determine whether or not Function 1 should be executed, and proceed accordingly.

The event handler converts the execution event address (currently referenced by the function pointer) into an index to recover the original memory location referenced by the function pointer. For example, in the case in which Function 1 is called, the event handler takes the address of the execution event (e.g., B), subtracts the base physical address, and generates an index (e.g., 0, for Function Pointer 1, since Function Pointer 1 pointed to B, with 0 offset). Virtual machine manager 310 uses the calculated index to find the address of the original memory location referenced by Function Pointer 1 using saved pointers data structure 315 (e.g., Saved Pointers [1] of FIG. 3, which stores function pointer 1=&function code 1) and supplies the address of the original memory location to guest virtual machine 205, such that Function Code 1 is executed by guest virtual machine 205.

According to an embodiment of the present invention, the function can be implemented as a debug service routine handler. According to one embodiment of the present invention, a debug service routine handler is implemented as part of the kernel. The debug service routine handler, when executed, monitors a predetermined interrupt that other portions of the kernel use to report debugging messages and the loading of driver events. According to one embodiment of the present invention, to invoke the debug service routine handler, a software module includes an INT 2D (2D is a hexadecimal representation of the number of a particular interrupt) instruction, which, when executed by a processor, results in the processor generating an interrupt. The processor transfers control of the to the interrupt handler of Interrupt 2D, which is identified as the debug service routine handler.

Accordingly, the interrupt can be implemented by a debug service routine interrupt, which is generated by an executing device driver loading function, such as, for example, ZwLoadDriver and MmLoadSystemImage in Windows XP®.

Figure 4:
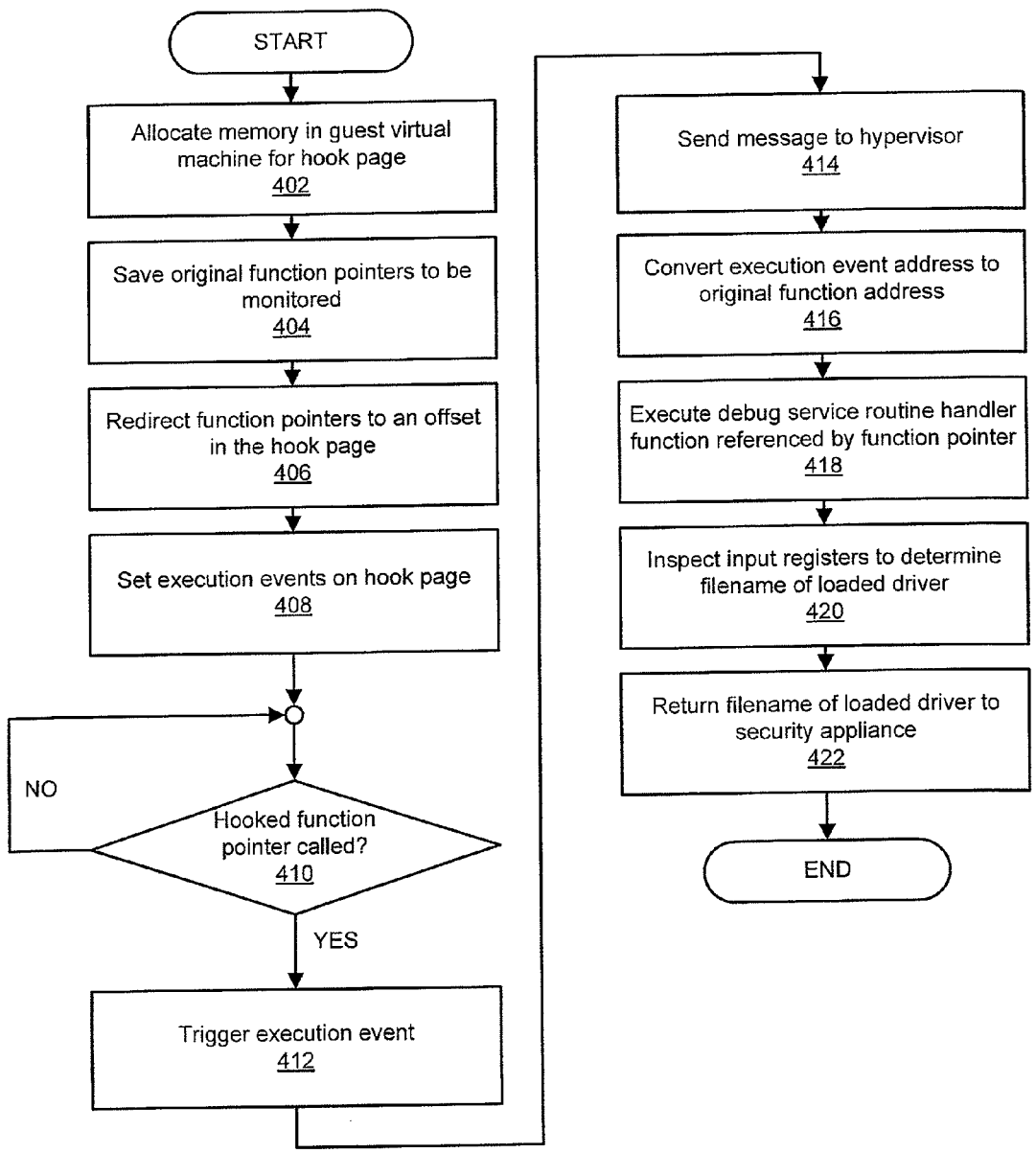
FIG. 4 is a high-level flowchart illustrating a method for logging the operations within guest virtual machines, according to one embodiment.

FIG. 4 is a simplified flowchart illustrating an example method for managing operations within guest virtual machines. The process of FIG. 4 begins with the virtual machine manager of a hypervisor (e.g., virtual machine manager 310 of FIG. 3) allocating memory in a guest virtual machine (e.g., guest virtual machine 205 of FIG. 2B) for a hook page (e.g., hook page 245 of FIG. 2B), as shown in 402. For each function to be monitored (or hooked), the virtual machine manager creates an entry within a saved pointers data structure (e.g., saved pointers data structure 315 of FIG. 3) that forms an association between a function pointer and the address pointed to by the function pointer (shown in 404). As previously discussed, the address pointed to by the function pointer (a result of the "&" operation) is the address of the function code. The virtual machine manager modifies the function pointers to point to an offset in the hook page (406). The virtual machine manager sets execution triggers on the hook page (408), which notify the virtual machine manager when a particular function is called by the guest virtual machine.

According to an embodiment of the present invention, a function such as a debug service routine handler can be hooked in this manner. Such a function hooking technique is used to notify the hypervisor that a device driver has been loaded. The execution trigger installed on the hook page notifies the hypervisor that the debug service routine handler function has been called.

The hypervisor then determines if a function (e.g., debug service routine handler), hooked by a hooked function pointer, has been called by the guest virtual machine (410). According to one embodiment, if the guest virtual machine calls a function (e.g., debug service routine handler) that is hooked by the virtual machine manager, several operations are performed. During execution, the device driver loading function generates a debug service routine interrupt, which indicates that a device driver is being loaded by the guest virtual machine. The guest virtual machine encounters the debug service routine interrupt and searches an interrupt descriptor table (e.g., interrupt descriptor table 230 of FIGS. 2A and 2B) for a function pointer that corresponds to the received debug service routine interrupt. Once the appropriate function pointer is located, that function pointer is referenced, which, in tern, further references a location on the hook page. The hook page location includes at least one execution trigger, which is triggered by the function pointer call (412). The execution event triggers the sending of a message that includes the execution trigger address. The message is sent to the virtual machine manager within the hypervisor (414). The virtual machine manager receives the message and converts the execution event address in the message to the original function code address using the saved pointers data structure. In response to the virtual machine manager's receipt of the message, the virtual machine manager sends a message to the guest virtual machine with the original address of the function code to which the function pointer pointed (416). The guest virtual machine, using the original address, is then able to execute the debug service routine handler, which notifies a debug handler, if attached, of the loading of a device driver (418). In response to receiving the message, the security appliance, executing within the security virtual machine, inspects the input registers of the guest virtual machine (420). The input register inspection returns a list that identifies the device drivers currently loaded in the guest virtual machine to the security appliance (422).

An Example Computing Environment

Elements of network architecture can be implemented using a variety of computer systems and networks. An example of one such network environment is described below with reference to FIG. 5.

Figure 5:
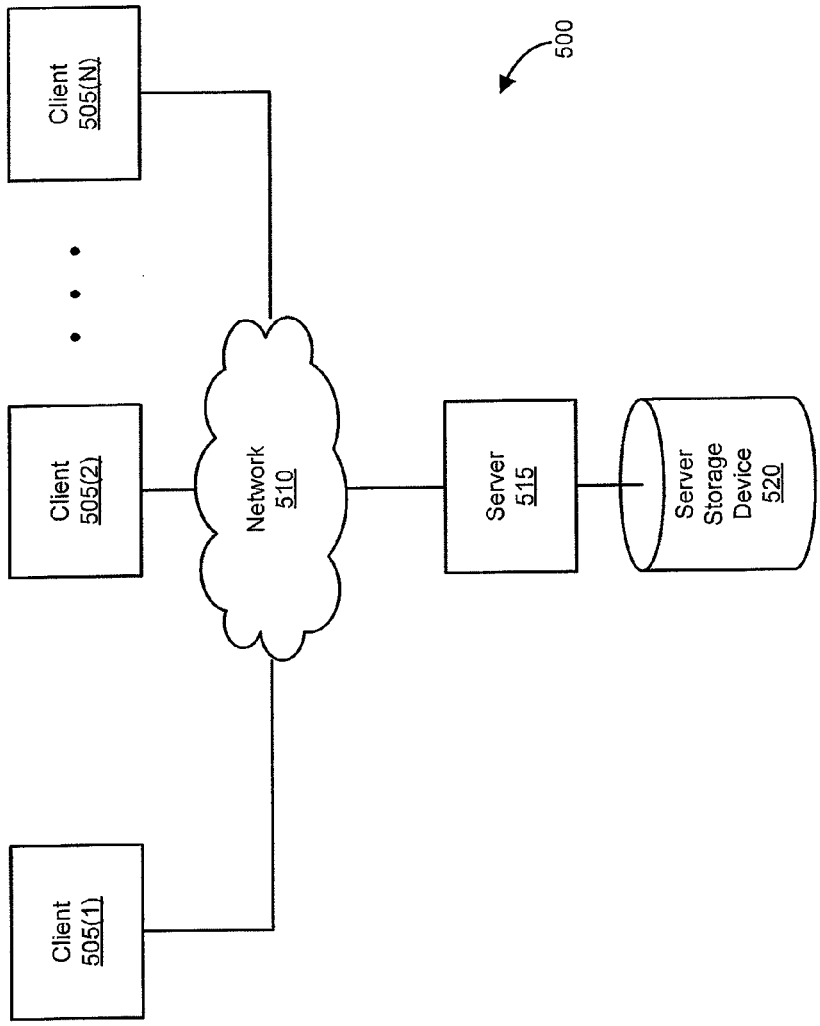
FIG. 5 is a block diagram illustrating a network architecture in which an embodiment of the present invention can be implemented.

FIG. 5 is a simplified block diagram illustrating a network architecture 500 in which one or more clients are provided with access to a server via various network connections. As depicted in FIG. 5, clients 505(1)-(N) are coupled to a network 510, and so are able to access a server 515 (which can be used to implement server 105 of FIG. 1) via network 510. A client can be implemented using, for example, a desktop computer, a laptop computer, a workstation, a server, a cell phone, a smart phone, a network-enabled personal digital assistant (PDA), or the like. An example of network 510, which can be used by clients 505(1)-505(N) to access server 515, is the Internet. Alternatively, access to server 515 can be provided by a local area network (LAN) utilizing Ethernet, IEEE 802.11x, or some other communications protocol. As will be appreciated, server 515 can be accessed by clients coupled directly thereto (not shown).

As also depicted on FIG. 5, server 515 is coupled to a server storage device 520. Server storage device 520 can be implemented as a single storage device or a collection of storage devices. Server storage device 520 can also be implemented as a storage area network, which couples remote storage devices to a server (e.g., server 515), such that the remote storage devices appear as locally-attached storage devices to the server's OS, for example.

In light of the present disclosure, those of skill in the art will appreciate that server storage device 520 can be implemented by any type of computer-readable storage medium, including, but not limited to, internal or external hard disk drives (HDD), optical drives (e.g., CD-R, CD-RW, DVD-R, DVD-RW, and the like), flash memory drives (e.g., USB memory sticks and the like), tape drives and the like. Alternatively, those of skill in the art will also appreciate that, in light of the present disclosure, network architecture 500 can include other components such as routers, firewalls and the like that are not germane to the discussion of the present network and will not be discussed further herein. Those of skill in the art will also appreciate that other configurations are possible. For example, clients 505(1)-(N) can be directly coupled to server storage device 520 without the user of a server or Internet; server 515 can be used to implement both the clients and the server; network architecture 500 can be implemented without the use of clients 505(1)-(N); and so on.

Figure 6:
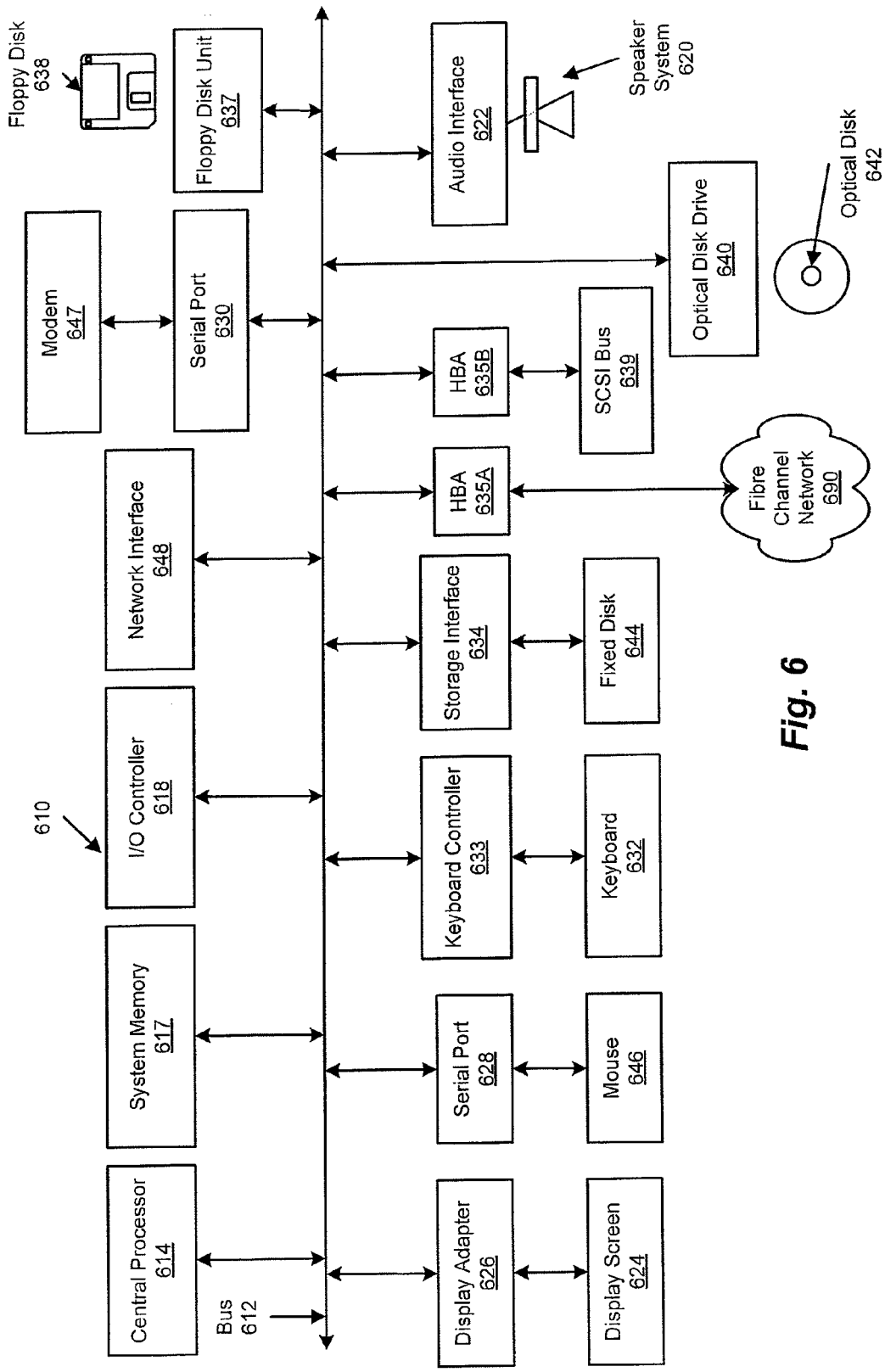
FIG. 6 is a block diagram that illustrates an example of a computer system suitable for implementing embodiments of the present invention.

FIG. 6 depicts a block diagram of a computer system 610 suitable for implementing a server (e.g., server 115 of FIG. 1), as well as the clients (e.g., clients 105(1)-105(N) of FIG. 1) used therein. Computer system 610 includes a bus 612, which interconnects major subsystems of computer system 610, such as a central processor 614, a system memory 617 (typically random-access memory (RAM), but which may also include read-only memory (ROM), flash ROM, or the like), an input/output controller 618, an external audio device, such as speaker system 620 via an audio output interface 622, an external device, such as a display screen 624 via display adapter 626, serial ports 628 and 630, a keyboard 632 (interfaced with keyboard controller 633), a storage interface 634, a floppy disk drive 637 operative to receive a floppy disk 638, a host bus adapter (HBA) interface card 635A operative to connect with a Fibre Channel network 690, a host bust adapter (HBA) interface card 635B operative to connect to a SCSI bus 639, and an optical disk drive 640 operative to receive an optical disk 642. Also included are a mouse 646 (or other point-and-click device, coupled to bus 612 via serial port 628), a modem 647 (coupled to bus 612 via serial port 630), and a network interface 648 (coupled directly to bus 612).

Bus 612 allows data communication between central processor 614 and system memory 617, which may include read-only memory (ROM) or flash memory (neither shown) and random access memory (RAM) (not shown), as previously noted. RAM is generally the main memory into which OS and application programs are loaded. ROM or flash memory can contain, among other code, the Basic Input-Output system (BIOS) which controls basic hardware operation such as the interaction with peripheral components. Applications resident with computer system 610 are generally stored on and accessed via a computer-readable storage medium, such as hard disk drive (e.g., fixed disk 644), an optical drive (e.g., optical drive 640), a floppy disk unit 637, or other computer-readable storage media.

Storage interface 634, as with other storage interfaces of computer system 610, can connect to a standard computer-readable storage medium for storage and/or retrieval of information, such as a fixed disk drive 644. Fixed disk drive 644 may be a part of computer system 610, or may be separate and accessed through other interface systems. Modem 647 can be employed to provide a direct connection to a remote server via a telephone link or to the Internet via an internet service provider (ISP). Network interface 648 may provide a direct connection to a remote server via a direct network link to the Internet via a point-of-presence (POP). Network interface 648 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras, and so on). Conversely, all of the devices shown in FIG. 6 need not be present. The devices and subsystems can be interconnected in different ways from that shown in FIG. 6. The operation of the computer system such as that shown in FIG. 6 is readily known in the art and is not discussed in detail in this application. Code to implement the previously-described features can be stored in computer-readable storage media such as one or more of system memory 617, fixed disk 644, optical disk 642, or floppy disk 638. The OS provided on computer system 610 can be, for example, MS-DOS®, MS-WINDOWS®, OS/2®, UNIX®, Linux®, or other known OS.

An example implementation of computer system 610, server 105 can store host operating system 110, hypervisor 115, security virtual machine 120, and guest virtual machines 130(1)-(N), all of FIG. 1, in computer-readable storage media (e.g., memory 617 and the like). Also, network interface 648 may be used by any of the modules described in server 105 and hypervisor 305. For example, the virtual machine manager can send and receive notifications concerning functions called within server 105 or in other parts of a network, as indicated in FIG. 5.

Moreover, regarding the messages and/or data signals described herein, those skilled in the art will recognize that a signal may be directly transmitted from a first block to a second block, or a signal may be modified (e.g., amplified, attenuated, delayed, latched, buffered, inverted, filtered, or otherwise modified) between the blocks. Although the signals of the above described embodiment are characterized as transmitted from one block to the next, other embodiments may include modified signals in place of such directly transmitted signals as long as the informational and/or functional aspect of the signals is transmitted between the blocks. To some extent, a signal input at a second block may be conceptualized as a second signal derived from a first signal output from a first block due to the physical limitations of the circuitry involved (e.g., there will inevitably be some attenuation and delay). Therefore, as used herein, a second signal derived from the first signal includes the first signal or any modifications to the first signal, whether due to circuit limitations or due to passage through other circuit elements which do not change the informational and/or final functional aspect of the first signal.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method, comprising:
   redirecting a reference from a first address to a second address, wherein
      the reference initially refers to the first address,
      the first address is an address of a function to be executed by a virtual machine, and
      the second address is an address of a second memory location in a memory page within the virtual machine;
   installing an execution event at the second memory location;
   in response to a request to load a software module in the virtual machine, triggering the execution event, wherein
      the execution event, when triggered, is configured to cause an indication to be sent to a hypervisor;
   in response to the triggering of the execution event, sending the indication to the hypervisor that the software module is loaded in the virtual machine;
   in response to the sending, accessing a first memory location in the virtual machine, wherein
      the accessing is performed using the hypervisor,
      a value is stored in the first memory location, and
      the value identifies the software module; and
   returning the value to the hypervisor.

2. The method of claim 1, wherein
   the function is a debug service function,
   the indication is a message, and
   the message indicates that the software module is loaded in the virtual machine.

3. The method of claim 2, further comprising:
   saving an original association between the reference and the first address.

4. The method of claim 2, wherein
   the request to load the software module in the virtual machine results in the second memory location being accessed.

5. The method of claim 4, further comprising:
in response to triggering the execution event, retrieving the original association; and
execute the debug service function at the first address.

6. The method of claim 2, wherein
the memory page is a non-pageable memory page, and
the memory page is located in a kernel memory of the virtual machine.

7. The method of claim 2, wherein the message is sent by a processor executing the debug service function.

8. A computer system comprising:
at least one processor;
a computer-readable storage medium coupled to the at least one processor; and
computer code, encoded in the computer-readable storage medium, configured to cause the at least one processor to:
redirect a reference from a first address to a second address, wherein
the reference initially refers to the first address,
the first address is an address of a function to be executed by a virtual machine, and
the second address is an address of a second memory location in a memory page within the virtual machine,
install an execution event at the second memory location,
trigger the execution event, in response to a request to load a software module in the virtual machine, wherein
the execution event, when triggered, is configured to cause an indication to be sent to a hypervisor,
send the indication to the hypervisor that the software module is loaded in the virtual machine, in response to the triggering of the execution event,
access a first memory location in the virtual machine, in response to the indication, wherein
the accessing is performed using the hypervisor,
a value is stored in the first memory location, and
the value identifies the software module, and
return the value to the hypervisor.

9. The computer system of claim 8, wherein
the function is a debug service function,
the indication is a message, and
the message indicates that the software module is loaded in the virtual machine.

10. The computer system of claim 9, wherein the computer code is further configured to cause the processor to:
save an original association between the reference and the first address.

11. The computer system of claim 9, wherein
the request to load the software module in the virtual machine results in the second memory location being accessed.

12. The computer system of claim 11, wherein the computer code is further configured to cause the processor to:
retrieve the original association, in response to triggering the execution event; and
execute the debug service function at the first address.

13. The computer system of claim 9, wherein
the memory page is a non-pageable memory page, and
the memory page is located in a kernel memory of the virtual machine.

14. The computer system of claim 9, wherein the message is sent by a processor executing the debug service function.

15. A non-transitory computer-readable storage medium comprising computer code, when executed, the computer code is configured to cause a processor to:
redirect a reference from a first address to a second address, wherein
the reference initially refers to the first address,
the first address is an address of a function to be executed by a virtual machine, and
the second address is an address of a second memory location in a memory page within the virtual machine;
install an execution event at the second memory location;
trigger an execution event, in response to a request to load a software module in the virtual machine, wherein
the execution event, when triggered, is configured to cause an indication to be sent to a hypervisor;
send the indication to the hypervisor that the software module is loaded in the virtual machine, in response to the triggering of the execution event;
access a first memory location in the virtual machine, in response to the sending wherein
the accessing is performed using the hypervisor,
a value is stored in the first memory location, and
the value identifies the software module; and
return the value to the hypervisor.

16. The non-transitory computer-readable storage medium of claim 15, wherein
the function is a debug service function,
the indication is a message, and
the message indicates that the software module is loaded in the virtual machine.

17. The non-transitory computer-readable storage medium of claim 16, wherein the computer code, when executed, is further configured to cause the processor to:
save an original association between the reference and the first address.

18. The non-transitory computer-readable storage medium of claim 16, wherein
the request to load the software module in the virtual machine results in the second memory location being accessed.

19. The non-transitory computer-readable storage medium of claim 18, wherein the computer code, when executed, is further configured to cause the processor to:
retrieve the original association, in response to triggering the execution event; and
execute the debug service function at the first address.

20. The non-transitory computer-readable storage medium of claim 16, wherein
the memory page is a non-pageable memory page, and
the memory page is located in a kernel memory of the virtual machine.

* * * * *